United States Patent [19]

Houck

[11] 4,353,580

[45] Oct. 12, 1982

[54] APPARATUS FOR REMOVABLY ATTACHING A PIPE

[76] Inventor: Theodore B. Houck, Rte. 1, Box 46, Haskell, Okla. 74436

[21] Appl. No.: 299,331

[22] Filed: Sep. 4, 1981

Related U.S. Application Data

[63] Continuation of Ser. No. 165,775, Jul. 3, 1980, abandoned.

[51] Int. Cl.³ .............................................. F16L 41/00
[52] U.S. Cl. ...................................... 285/39; 285/158; 285/19; 285/354; 285/369; 285/DIG. 2; 285/DIG. 19
[58] Field of Search ............... 285/231, 237, 354, 369, 285/DIG. 2, 39, 158 (U.S. only), 19, DIG. 19

[56] References Cited

U.S. PATENT DOCUMENTS

| | | | |
|---|---|---|---|
| 694,140 | 2/1902 | Crawford | 285/DIG. 2 X |
| 1,327,106 | 1/1920 | Leahy | 285/158 X |
| 1,848,198 | 3/1932 | Reid | 285/DIG. 19 X |
| 2,021,745 | 11/1935 | Pfefferle et al. | 285/369 X |
| 3,735,928 | 5/1973 | Watts et al. | 285/DIG. 2 X |
| 3,865,410 | 2/1975 | Chen | 285/369 X |
| 3,880,452 | 4/1975 | Fields | 285/369 X |

FOREIGN PATENT DOCUMENTS

| | | | |
|---|---|---|---|
| 2135514 | 1/1973 | Fed. Rep. of Germany | 285/337 |
| 950936 | 4/1949 | France | 285/354 |
| 1180652 | 1/1959 | France | 285/369 |

*Primary Examiner*—Thomas F. Callaghan
*Attorney, Agent, or Firm*—Head, Johnson & Stevenson

[57] ABSTRACT

An apparatus for removably attaching a pipe to a vessel wall having a short tubular body with the inner end adapted to be attached to a vessel wall to provide communication with an opening in the vessel, the outer end of the body having external threads and an integral reduced internal diameter portion of slightly larger internal diameter than the external diameter of the pipe to be received and a semi-circular cross-sectioned gasket receiving recess in the outer end, a circular flange having an opening therethrough of internal diameter slightly greater than the external diameter of the pipe to be attached and having internal threads dimensioned to engage the body threads and providing a planar gasket engaging surface, and a toroidal gasket dimensioned to be received on the pipe and within the semi-circular groove of the tubular body, the end of the pipe to be secured being positioned within the body and flange whereby when the flange is threadably advanced onto the body the gasket is forced into sealed engagement with the external surface of the pipe and the pipe is sealed by the flange even when in imperfect axial alignment with the body.

3 Claims, 7 Drawing Figures

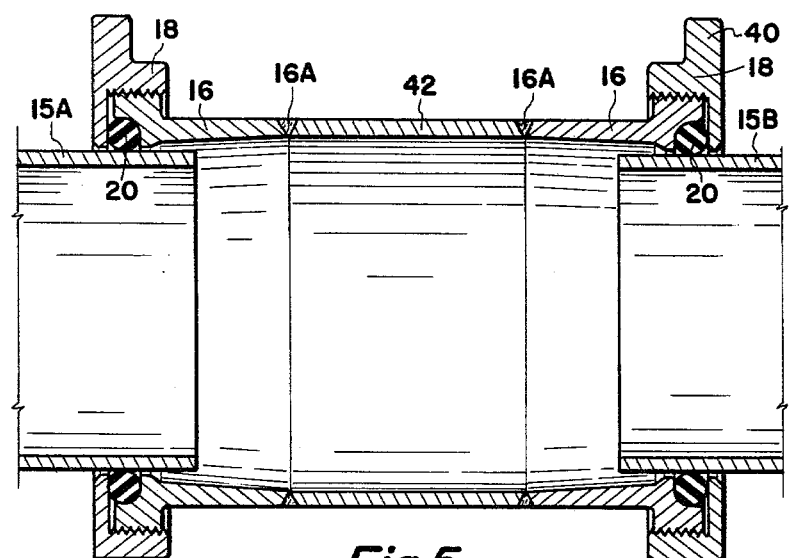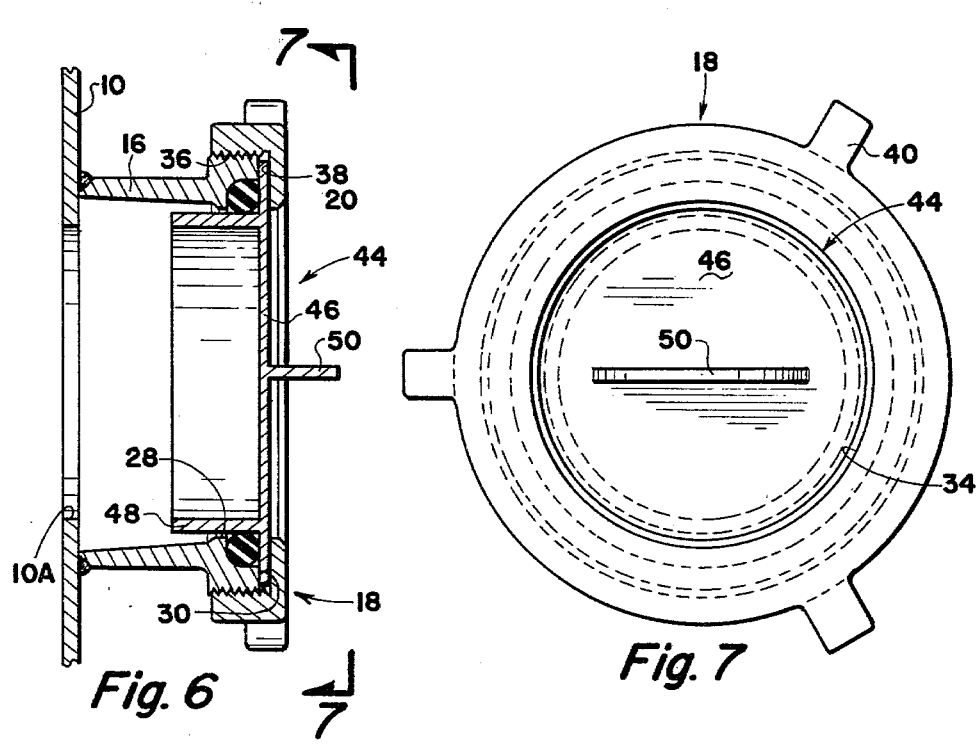

APPARATUS FOR REMOVABLY ATTACHING A PIPE

This is a continuation application of Ser. No. 165,775, filed July 3, 1980 and now abandoned.

BACKGROUND OF THE INVENTION

1. Field of the Invention

This invention relates to apparatus for removably attaching a pipe to a vessel wall. The invention is particularly useful in the petroleum industry when a series of vessels, such as mud tanks, must be attached to each other and when it is difficult to accurately align the openings in the vessels. The invention provides a type of coupling or union wherein a pipe may be expeditiously attached even though it is not in perfect axial alignment and without requiring the pipe to be threaded. Further, the apparatus provides means wherein the length of the pipe may vary and in which the device can be attached to or removed from a pipe without the use of a wrench.

2. Description of the Prior Art

Many different devices exist for connecting one vessel to another or connecting a pipe to a vessel wall including the use of bolted flanges, welded flanges, screw fittings, and so forth. All of the known devices work satisfactorily to an extent. There are certain applications in industry wherein it is desirable to be able to expeditiously connect one vessel to another with a short length of pipe. For this application it is desirable to provide a fitting by which a pipe may be attached to a vessel, or, more specifically, a pipe utilized to connect one vessel to another, in which the pipe does not have to be in exact alignment with the openings to be connected and in which the length of the pipe can vary slightly. In addition, the present invention provides a fitting wherein only a hammer is used in both connecting and disconnecting a pipe from a vessel. This arrangement eliminates the possibility of threads being crossed and eliminates need for specialized piping tools as is required in most of the fittings known in the prior art.

It is therefore an object of this invention to provide an improved fitting for use in connecting a pipe to a vessel wall.

More particularly, an object of this invention is to provide a type of fitting wherein a pipe may be connected to a vessel wall in which the pipe can be sealably connected even though not in perfect axial alignment with the fitting and in which the length of the pipe may vary slightly and in which the pipe may be connected to the vessel wall or disconnected from it without employing specialized tools, but instead, employing only a hammer.

These general objects as well as other and more specific objects of the invention will be fulfilled in the following description and claims, taken in conjunction with the attached drawings.

SUMMARY OF THE INVENTION

An apparatus is provided for removably attaching a pipe to a wall of a vessel having an opening therein. It consists of a tubular body of short axial length adapted at one end for attachment to the vessel, such as by welding, to provide communication with an opening in the vessel. The body has, at its outer end, an integral enlarged external diameter portion having external threads thereon. Adjacent the outer end of the body is an integral reduced internal diameter portion, the internal diameter of which is slightly greater than the exterior diameter of the pipe to be attached. The outer end surface of the body in cross-section in a plane of the tubular axis, is defined by an outer planar portion perpendicular the tubular axis and an inwardly positioned semi-circular portion connecting the reduced internal diameter portion and the planar end surface. A circular flange has an inner end and an outer end. The outer end has an opening therethrough of internal diameter slightly greater than the external diameter of the pipe to be attached and substantially equal to the internal diameter of the body reduced internal diameter portion. The flange has internal threads at the inner end dimensioned to engage the body external threads and it is defined in a plane of the tubular axis by an annular planar surface extending from the axial opening to the internal threads. A toroidal gasket is employed having an internal diameter substantially equal to or slightly less than the pipe to be received. The gasket is positioned on the pipe between the body end semi-circular portion and the flange. The gasket is compressed sealably against the exterior surface of the pipe as the flange is threaded tightly onto the body. In a preferred arrangement the flange has external circumferential lobes extending from the outer surface so that the flange may be rotated onto or off the body by hammering on the lobes.

BRIEF DESCRIPTION OF THE VIEWS

FIG. 5 is a cross-sectional view of an embodiment of the invention wherein two of the devices are secured to an intermediate length of conduit to thereby provide a coupling apparatus for quickly connecting and disconnecting lengths of pipe.

FIG. 6 is an elevational cross-sectional view of the device as shown connected to an opening in a vessel and showing a means whereby the opening may be closed utilizing the device of this invention.

FIG. 7 is an external elevational view taken along the line 7—7 of FIG. 6.

DETAILED DESCRIPTION

Figure 1:
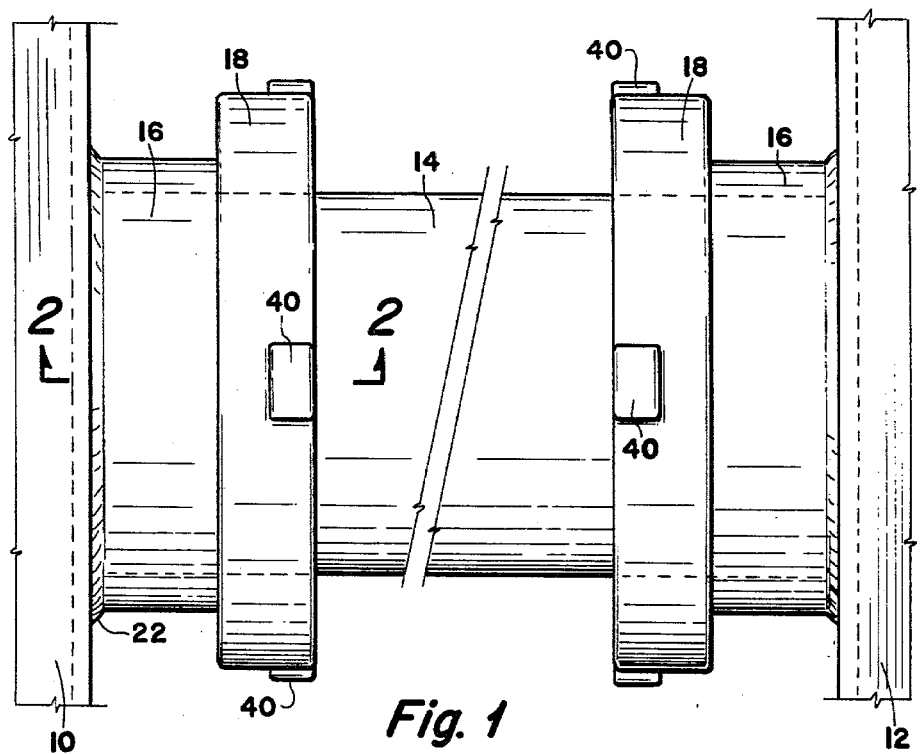
FIG. 1 is an external elevational view of two of the devices of this invention shown secured to two spaced apart vessels with a pipe therebetween showing how the device of this invention may be employed to interconnect two vessels.
Figure 4:
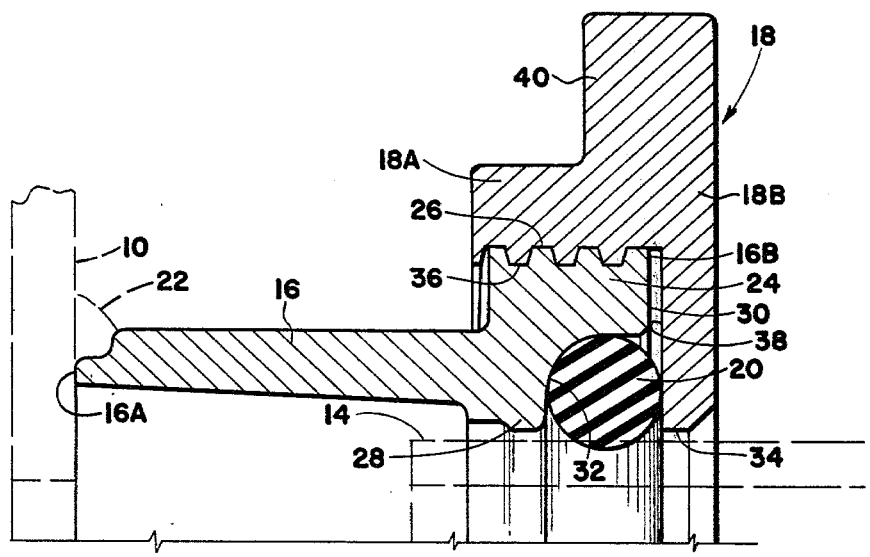
FIG. 4 is an enlarged sectional view of the device showing the details thereof in greater clarity, the cross-sectional view being taken in a plane parallel the tubular axis of the tubular body of the device.

Referring first to FIG. 1, the environment in which the invention is particularly useful is illustrated. The numeral 10 is a portion of a vessel wall and a second vessel wall spaced from the first is indicated by the numeral 12. The apparatus of this device is provided to enable the vessels to be connected together by means of a length of pipe 14. The pipe 14 is not required to be threaded but simply of plane end and of circular external configuration.

Figure 2:
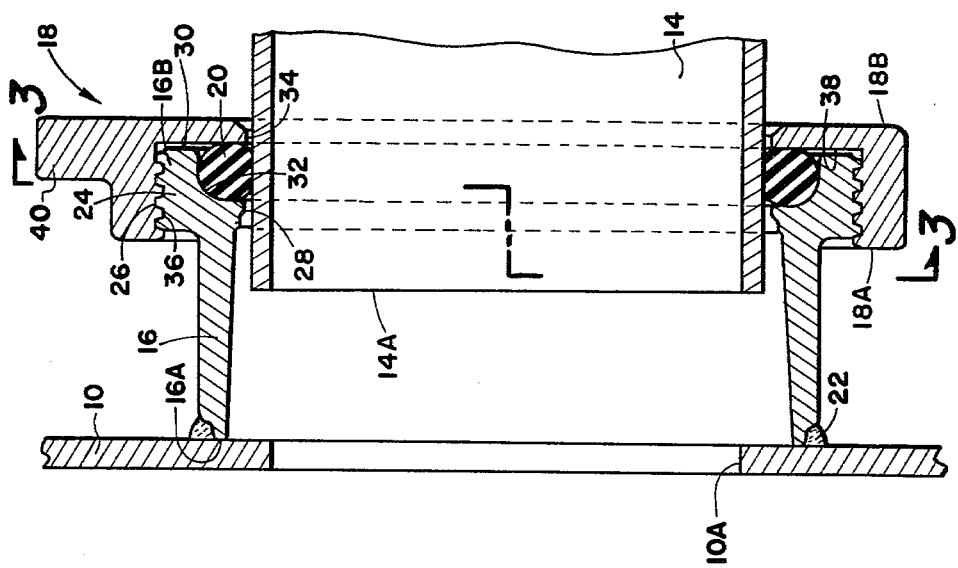
FIG. 2 is a cross-sectional view taken along the line 2—2 of FIG. 1.

Referring to FIG. 2, more details of the device can be seen. The coupling apparatus consists of three basic elements, that is, a tubular body 16, a flange generally indicated by the numeral 18, and a toroidal elastomeric gasket 20.

The tubular body 16 will first be described. The body has an inner end 16A which is adapted to be affixed to vessel 10 such as by welding 22. The vessel 10 has an opening 10A so that when the tubular body 16 is welded in position it provides communication with the interior of the vessel through opening 10A.

The tubular body has an outer end 16B having an integral enlarged external diameter portion 24 with external threads 26 thereon.

The tubular body 16 includes an integral reduced internal diameter portion 28, the internal diameter of which is slightly greater than the external diameter of pipe 14.

The outer end surface of the tubular body outer end 16B is defined in cross-section in a plane of the tubular axis by an outer planar surface 30 which is perpendicular the axis of the tubular body 16 and by an inward semi-circular portion 32 which connects the reduced internal diameter portion 28 and the planar end surface 30.

Flange 18 has an inner end 18A and an outer end 18B. The outer portions of the flange include an opening 34 slightly greater diameter than pipe 14 and substantially equal to the internal diameter of the body integral reduced internal diameter portion 28. The flange has, in communication with its inner end 18A, internal threads 36 which are dimensioned to threadably engage the tubular body external threads 26.

The flange has an annular planar surface 36 extending from the axial opening 34 to the internal threads 36.

Figure 3:
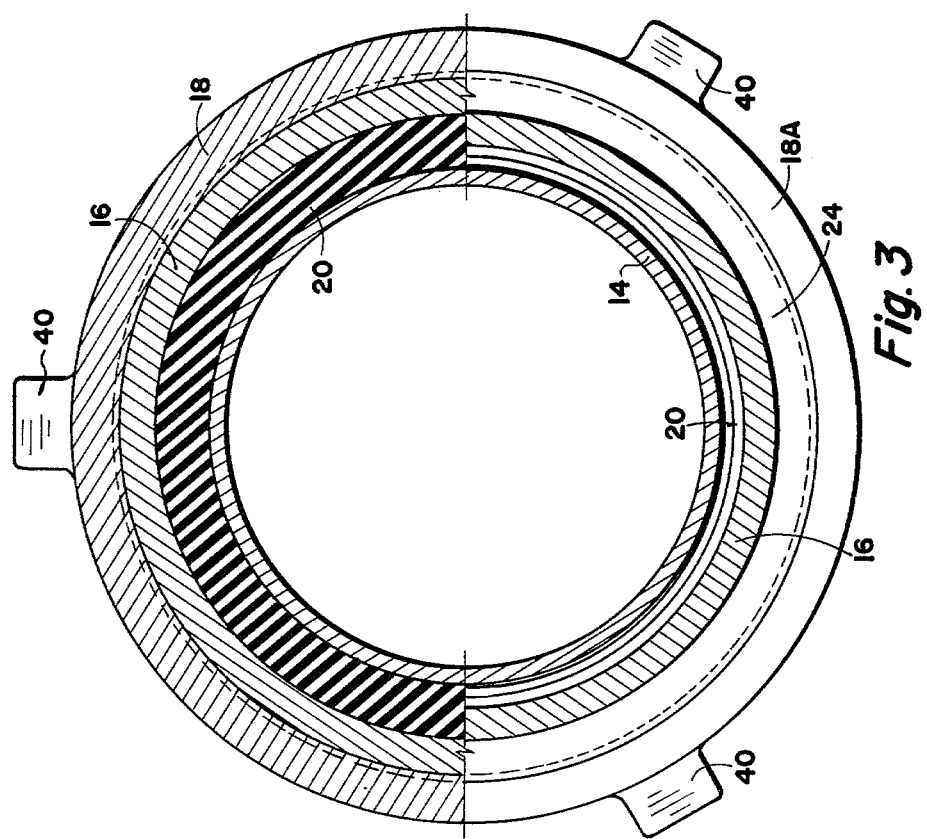
FIG. 3 is a cross-sectional view taken along the line 3—3 of FIG. 2.

In the preferred arrangement the flange 18 has on its external circumferential surface a plurality of spaced apart increased external diameter lobes 40 (see FIG. 3). While only 3 lobes 40 are illustrated, obviously more or less may be utilized. The advantage of lobes 40 are that they permit the flange 18 to be rotated, either onto or off of body 16, by means of a hammer, thus eliminating the use of wrenches or other specialized tools.

The final element of the coupling apparatus is the toroidal gasket 20 which is formed of elastomeric material such as natural or synthetic rubber or plastics. The gasket is preferably of internal diameter substantially equal to or slightly less than the external diameter of pipe 14. Gasket 20 is positioned on the exterior surface of the pipe and between the body semi-circular surface 32 and the flange planar surface 28.

OPERATION

To attach a pipe to the coupling the flange 18 is loosened by rotating it to unthread it relative to the tubular body 16. The end of pipe 14 is inserted into the coupling member past the gasket 20. When properly positioned the flange is tightened to compress gasket 20 and to seal engagement with the external cylindrical surface of the pipe.

Another means of inserting a pipe into the coupling means is to remove the flange 18 completely from the body. The flange 16 is positioned on pipe 14 and then gasket 20 is inserted into position on the pipe. The pipe end is inserted in body 16 and thereafter the flange 18 is threaded onto the body.

A significant advantage of the coupling device of this invention is that the pipe 14 does not have to be perfectly aligned with the coupling. More precisely, the tubular axis of pipe 14 does not have to be perfectly coaxial with the tubular axis of the body 16. A slight deviation will not prevent the gasket 20 from sealing against the exterior of the pipe. Another important advantage is that the length of the pipe 14 may vary considerably. The pipe end 14A, as shown in FIG. 2, may be substantially longer than that illustrated. It can be seen that in FIG. 1, if vessel walls 10 and 12 are secured in position with the tubular body 16 welded to them, pipe 14 may be utilized to connect the vessels together by first extending one end of the pipe as far as possible within one of the coupling means and then sliding it into position in the other, and then both flanges 18 tightened.

When it is necessary to disconnect the vessels 10 and 12 from each other, all that is necessary is that a hammer be employed to loosen the flanges by hammering on lobes 40 and the pipe 14 may then be removed, all of which can be accomplished in seconds and without the use of wrenches.

ALTERNATE EMBODIMENT

FIG. 5 shows an alternate application of the invention. The inner end 16A of two tubular body portions 16 are welded to the opposite ends of the short length of a conduit body 42. The assembled product then functions as a coupling apparatus by which two lengths of pipe 14A and 14B having plane, unthreaded ends, may be joined as shown. The pipes are connected together by inserting them within the coupling assembly and tightening flanges 18 so that the gaskets 20 are compressed into sealing engagement with the exterior of the pipes. An advantage of the coupling apparatus of FIG. 5 is that two lengths of pipe may be quickly and expeditiously coupled without the use of wrenches and the pipes do not have to be in perfect alignment. The joined pipes can be just as expeditiously disconnected from each other.

The length of the conduit body 42 can vary, and it can be seen that it may be eliminated altogether and the ends 16A of the tubular bodies 16 welded directly to each other. However, such arrangements allow a more limited latitude in the length of pipes 14A and 14B. By utilizing conduit body 42, the length of the pipes 15A and 15B may vary considerably which facilitates quicker and easier installation.

FIGS. 6 and 7 show another application of the invention. In FIG. 6 the tubular body 16 is welded to the wall 10 of a vessel as in FIG. 2. The coupling apparatus is otherwise exactly the same as previously described with reference to FIGS. 1-4; however, in FIGS. 6 and 7 means is provided for closing the opening 10A in the vessel. For this purpose, a closure member generally indicated by the numeral 44 is employed. The closure member includes a circular disc 46 of exterior diameter slightly less than the interior diameter of the flange threads 36. The disc 46 is received between the flange annular planar surface 38 and the body planar surface 30. The interior of disc 46 is in engagement with gasket 20.

To further ensure effective sealing of the closure member 44 an integral annular tubular portion 48 is employed, the external diameter of which is slightly less than the internal diameter of the body portion 28. To facilitate handling of the device when it is being placed in position and removed, a forwardly extending handle 50 is attached to the outside surface of disc 46. The closure member 44 can be quickly installed or removed by rotating the flange 18 in the same manner as connecting a pipe as shown in FIG. 2. In addition, it can be seen that instead of the tubular body 16 being connected to the vessel 10, it could be connected to another length of pipe or to a coupling as in FIG. 5 with the closure member 44 utilized for providing means to close off the end of the length of pipe.

While the invention has been described with a certain degree of particularity, it is manifest that many changes may be made in the details of construction and the arrangement of components without departing from the spirit and scope of this invention. It is understood that the scope is to be determined by that of the attached claim or claims, including the full range of equivalency to which each element thereof is entitled.

What is claimed:

1. Apparatus for removably attaching a pipe comprising:
    a tubular body of short axial length adapted at its inner end for attachment to a vessel, pipe or other object with which communication is required, the body having, at the outer end an integral enlarged external diameter portion having external threads thereon, the body having adjacent and spaced from its outer end an integral reduced internal diameter circumferential portion, the internal diameter of which is slightly greater than the external diameter of the pipe to be attached, the outer end surface of the tubular body being defined in cross-section in a plane of the tubular axis by an outer planar portion perpendicular the tubular axis providing a relatively large area planar annular surface and by an inward semi-circular portion of selected radius connecting the reduced internal diameter portion and the planar annular end surface;
    a circular flange having an inner end and outer end and having an axial opening therethrough of internal diameter slightly greater than the external diameter of the pipe to be attached and substantially equal to the internal diameter of said body reduced internal diameter portion, and having an enlarged internal diameter portion communicating with said inner end and having internal threads dimensioned to engage said body external threads, and the flange being defined in a plane of the tubular axis by a relatively large area annular planar surface extending from said axial opening therethrough to said enlarged internal diameter threaded portion;
    a toroidal gasket defined in cross-section by a circle of a radius substantially equal said tubular body end surface semi-circular portion radius, the gasket having an internal diameter substantially equal or less than the external diameter of the pipe to be received, the gasket being received on a pipe between said body and said flange within said body end semi-circular portion, the gasket being compressed sealably against the pipe and normally extending beyond said tubular body outer planar surface and as said flange is threadably tightened onto said body to the maximum tightened position, said flange annular planar surface engages and compresses the gasket and engages said body large area planar annular surface; and
    said flange having an external circumferential surface having a plurality of spaced apart increased external diameter lobes whereby said flange may be threaded onto or off of said body by hammering on the lobes.

2. An apparatus according to claim 1 including:
    a short length of conduit; and
    a pair of said tubular bodies each having said inner ends thereof welded to opposite ends of said conduit, and including a said circular flange and gasket for each tubular body, the assembled structure providing means of connecting together two lengths of plane end pipes.

3. An apparatus according to claim 1 including means for closing said tubular body against the flow of fluid therethrough comprising:
    a closure member including:
        a metal disc of external diameter less than said flange internal threads;
        a short tubular portion affixed coaxially to one surface of said disc, the external diameter of the tubular portion being slightly less than said body integral reduced internal diameter portion,
        the disc being received between said flange and body outer planar surface and said flange annular planar surface and said tubular portion being received by said gasket whereby when said flange is tightened said tubular body is closed against fluid flow therethrough.

* * * * *